June 9, 1964 D. GOLDROSEN 3,136,416
PACKAGE FOR PLASTIC ARTICLES
Filed Nov. 22, 1961 3 Sheets-Sheet 1
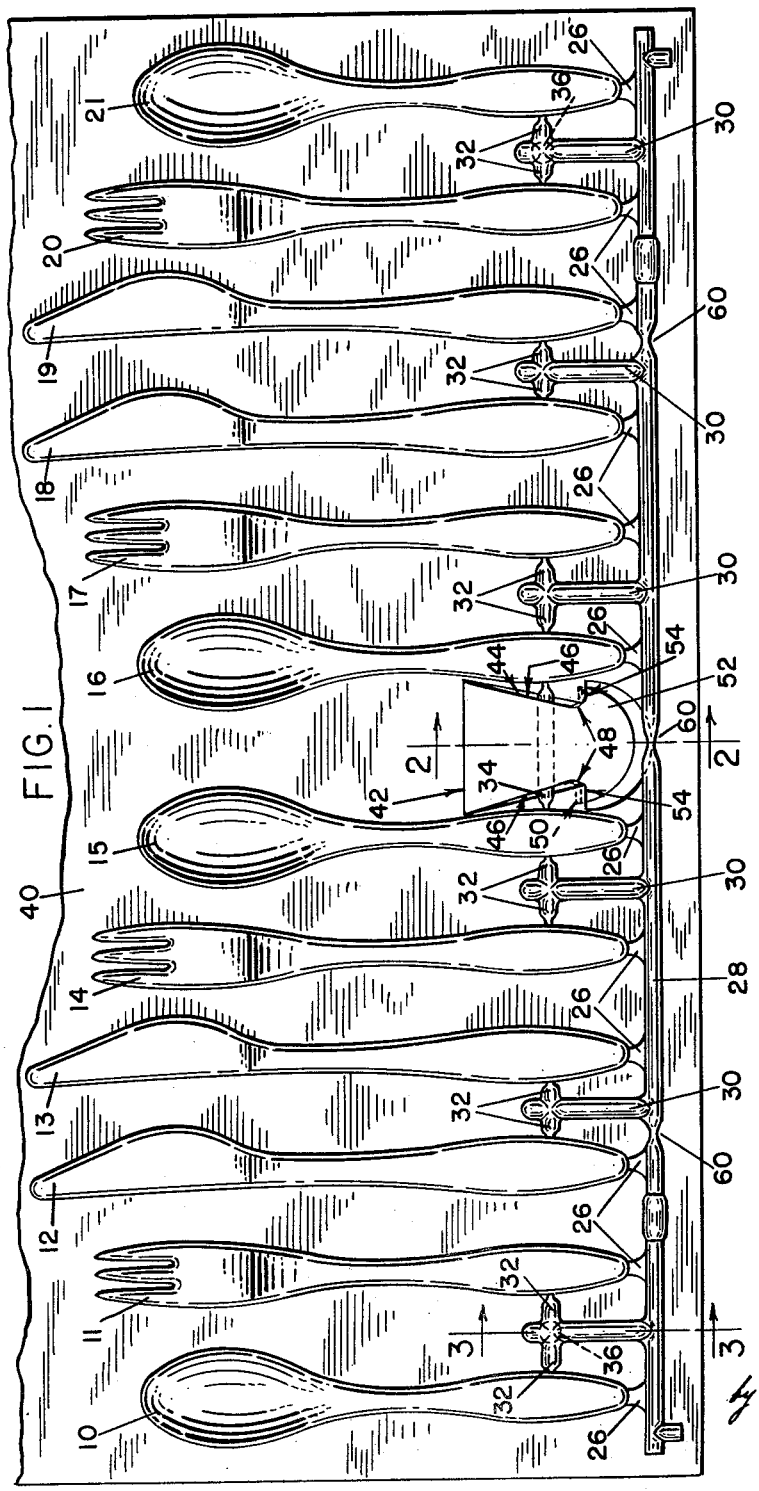
INVENTOR
DAVID GOLDROSEN
ATTORNEY June 9, 1964  D. GOLDROSEN  3,136,416
PACKAGE FOR PLASTIC ARTICLES
Filed Nov. 22, 1961  3 Sheets-Sheet 2
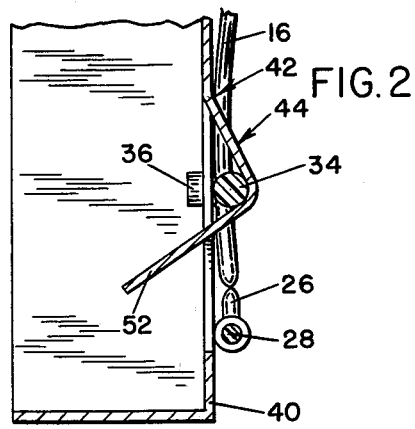
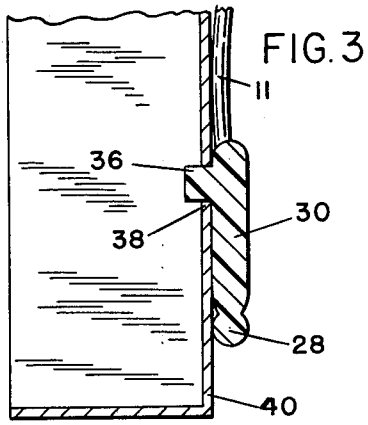
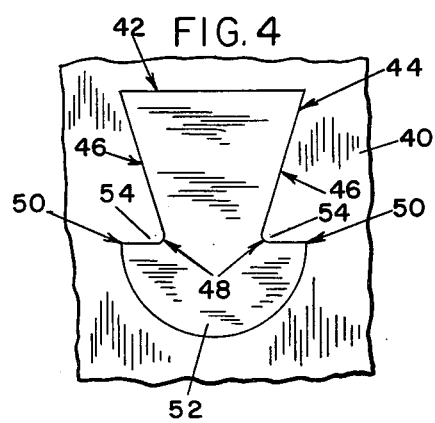
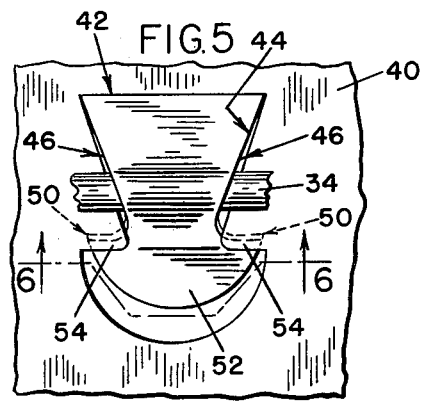
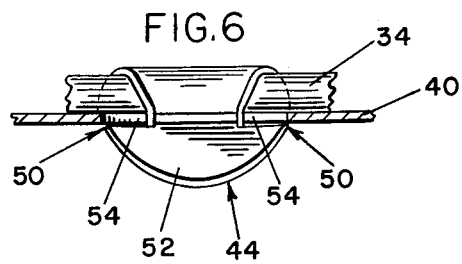
INVENTOR
DAVID GOLDROSEN
ATTORNEY June 9, 1964  D. GOLDROSEN  3,136,416
PACKAGE FOR PLASTIC ARTICLES
Filed Nov. 22, 1961  3 Sheets-Sheet 3
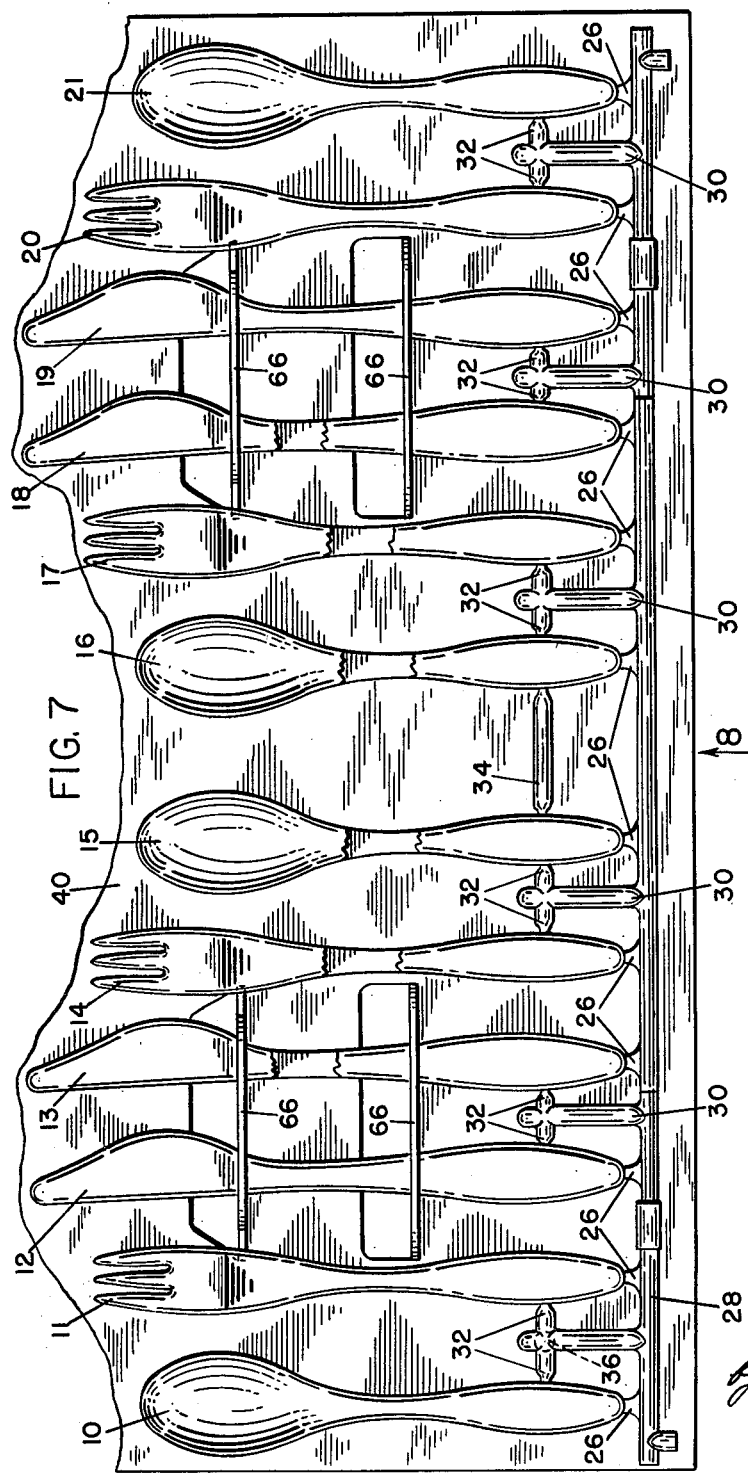
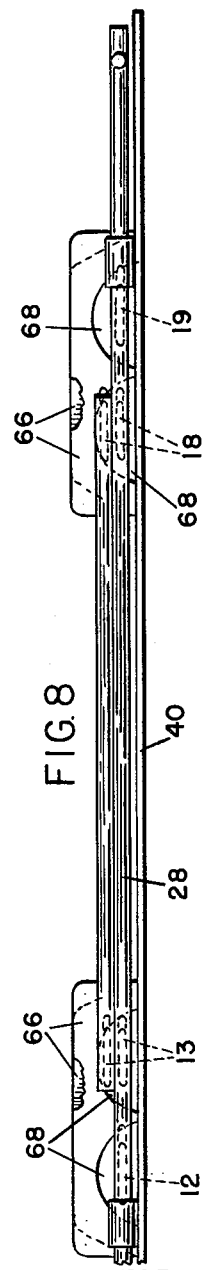
INVENTOR
DAVID GOLDROSEN
by Charles R. Fay
ATTORNEY United States Patent Office 3,136,416
Patented June 9, 1964

3,136,416
PACKAGE FOR PLASTIC ARTICLES
David Goldrosen, % Dapol Plastics, Inc.,
53 Northboro St., Worcester, Mass.
Filed Nov. 22, 1961, Ser. No. 154,125
1 Claim. (Cl. 206—56)

This invention relates to the art of making small molded articles of plastic and, in the specific embodiment of the invention, reference is made to knives, forks and spoons which may be sold in sets of, for instance, one knife, fork and spoon, two knives, two forks and two spoons, or three of each, four of each, etc.

It is the general object of the invention to provide these articles to the ultimate consumer less expensively than heretofore by eliminating a large part of the handling ordinarily required, after the articles have been molded in a shot, and including reduction of the time taken in separating the individual articles from the runners and in reducing the time required to package the sets.

In carrying out the invention, the knives, forks and spoons are molded in a plurality of series of sets, each one of which includes a knife, fork and spoon, this being distinct from the prior art in which ordinarily the knives are molded in a section, the forks in a section, and the spoons in a section, thus requiring separation of all of the parts in the lot in order to provide sets of knives, forks and spoons which have to be thereafter separated, assembled, and packaged.

In the present case, say a series of four sets of knives, forks and spoons are molded attached to a single runner. It is then merely necessary to break the runner between each set in order to provide any number required of knives, forks and spoons in separate sets, which may then be quickly and easily broken off by the consumer himself; or a set of four series of articles may be sold still attached to one runner and the runner attached to a cardboard forming a package, or two sets may be sold on a card or in an envelope or three sets still attached, etc. may thus be handled and it will be seen that this provides a series of dissimilar articles which are less expensive to manufacture because the handling has been greatly reduced.

Another object of the invention resides in the provision of a package which essentially consists of a cardboard or the like sheet of material having a certain new and improved tab with shoulders cut out from the sheet and capable of being manipulated to form a sort of trap or catch, and the article to be attached thereto includes a relatively elongated runner portion by which a plurality of series of articles are molded being attached by gates which extend from the runner to the various articles, by which a single unit comprising a great many molded articles, each useful for ultimate consumption, are held to the sheet, said tab having a head adapted to be caught under the shoulders to form the catch and latching said improved connection to hold the parts in place on the cardboard; and the provision of a device of the class described including certain portions of the runner system being provided with pins which extend through holes in the cardboard in spaced relation to the cut-out tab, holding the articles in position against tilting action in a plane parallel to the plane of the cardbroad.

Other objects and advantages of the invention will appear hereinafter.

Reference is to be had to the accompanying drawings, in which

FIG. 1 is a plan view illustrating the package;

FIGS. 2 and 3 are enlarged sections respectively on lines 2—2 and 3—3 of FIG. 1;

FIG. 4 is an enlarged plan view illustrating the shape of the tab;

FIG. 5 is a similar view showing the tab bent down to catch the head under the shoulders;

FIG. 6 is a section on line 6—6 of FIG. 4;

FIG. 7 is a view similar to FIG. 1 but showing a modification, and

FIG. 8 is an edge view, looking in the direction of arrow 8 in FIG. 7

A great many small articles may be molded simultaneously in a plastic injection molding die. These articles are connected by the runners which come from the sprue and the articles are connected to the runners by means of gates providing for access of the fluid plastic material into the various die cavities. Ordinarily these articles are then broken or cut from the gates and packaged one-by-one, but in the present case one of the advantages of the invention resides in reduction of prior art handling by packaging the entire shot or a part of the shot at one time and in the relationship as molded. In order to illustrate the invention, the same is shown in FIG. 1 as applied to a series of molded plastic tableware in the form of knives, spoons and forks or the like, but the invention applies also to any small articles which may be found suitable for handling in the same or a similar way.

There may be as many such articles handled as desired, but only so many have been illustrated for instance as in FIG. 1 as is necessary to explain the invention. These articles are indicated at 10 to 21 inclusive, and each one is connected as for instance by its own individual gate 26 to the runner 28 which emanates from the sprue not shown, the runner having been broken from the die upon opening of the die plates and ejection of the shot. Also a single sprue may accommodate many runners, and as a matter of fact in the particular instance in the present case there are at least four of these runners between indents 60 (see FIG. 1), which are originally connected but are broken off in order to make separate packages of a plurality of articles in each package.

In order to steady and rigidify the articles which it will be seen are relatively elongated, each one of the articles is also connected by continuation of the runner as by a plastic member 30. Each plastic member 30 extends laterally from the runner and is a part of the runner system and has a small connection 32 with respect to the adjacent articles. There is one of these runner parts 30, 30 between each pair of members. It will be seen particularly that those at 16 and 18 which are the central members being molded are connected to their adjacent members but not to each other by a runner part 30. In addition, the members 15 and 16, the central pair, are connected by another portion of the runner system, member 34, which extends between the articles 15 and 16 as clearly shown in FIG. 1. The outside or other selected runners 30, 30 may be provided with pins 36 which project toward the rear and through apertures 38, see FIG. 3, in a cardboard member 40 which forms the card upon which the members are to be packaged, see particularly FIG. 3.

The cardboard member 40 has generally centrally thereof a cutout tab the shape of which is best shown in FIG. 4. The line at 42 indicates a bend line. Starting at the ends of this bend line 42 the tab generally indicated at 44 is cut out in a continuous line from one end of line 42 to the other. First the cut line extends inwardly at 46, 46 at both sides of the tab, extending into a narrow cut-out portion 48 and then from portion 48 the tab extends outwardly to points 50 so as to form a head 52 having shoulders at the points 50, 50. The portion of the cardboard 40 from which the tab is cut out is provided therefore with cooperating or complementary shoulders 54, 54.

When the tab is bent outwardly from the plane of cardboard 40 and the head 52 is bent inwardly as for instance as best understood from say a comparison of FIGS. 2, 5 and 6, the shoulders at 50, 50 slide rearwardly as shown in dotted lines for instance in FIG. 5 and the tab is lightly frictionally held in this position until manually released. This causes the main portion at 44 of the tab to be bent upwardly, see FIGS. 2 and 6 forming the trap or catch. The cross rod 34 is slipped under the tab just before the head portion 52 thereof is bent downwardly to the FIG. 2 position and caught under the shoulders 54, 54, thus holding the entire shot in position where desired on the card 40. The pins 36 prevent dislodgment in a plane parallel to the cardboard surface.

It will be seen that this invention presents a great advantage with respect to handling as it avoids the necessity of breaking the individual members 10 to 21 inclusive from the gates, i.e., from the runner, and it also completely avoids the necessity of thereafter handling each of the articles individually and separately to apply to the card or to some other container, in sets of one, two and more series of dissimilar articles, and at the same time the shot is firmly but lightly held on the card in position and will not slide around and become detached, etc. until the customer removes it and himself then breaks the pieces from the runner.

A modification of the invention at least as to packaging is shown in FIGS. 7 and 8 wherein the shot is the same as before but instead of using tab 44, different tabs 66 are cut and turned up in pairs as shown and these have openings 68 so that a pair of shots can be held by thrusting certain articles such as those at 13 and 19 into the openings. The shots can be whole or part only.

Having thus described my invention and the advantages thereof, I do not wish to be limited to the details herein disclosed, otherwise than as set forth in the claim, but what I claim is:

As an article of manufacture, a series of molded plastic articles each of which is of different configuration but each of which cooperates with each of the others to form a set of articles, a runner connecting said articles, a second series of similar articles of different configuration connected to the same runner in spaced relation thereto, and means for facilitating breaking the runner to separate the series of articles into separate series while the articles of each series are maintained in fixed relation relative to each other by the runner, wherein each series comprises a fork, knife, and spoon.

References Cited in the file of this patent
UNITED STATES PATENTS

| | | |
|---|---|---|
| 309,414 | Smith | Dec. 16, 1884 |
| 1,221,184 | Johnston | Apr. 3, 1917 |
| 1,477,241 | Carson | Dec. 11, 1923 |
| 1,881,293 | Poirier | Oct. 4, 1932 |
| 2,656,917 | Hollis | Oct. 27, 1953 |
| 2,675,912 | Foster | Apr. 20, 1954 |
| 2,778,336 | Ligouri | Jan. 22, 1957 |
| 2,811,702 | Narozny | Oct. 29, 1957 |
| 2,819,792 | Margulis | Jan. 14, 1958 |
| 2,884,150 | Weichselbaum | Apr. 28, 1959 |
| 2,928,100 | Gagnon | Mar. 15, 1960 |
| 2,944,330 | Swick | July 12, 1960 |
| 2,964,171 | Chadwick | Dec. 13, 1960 |